United States Patent
Tsutsumi et al.

(10) Patent No.: US 12,012,485 B2
(45) Date of Patent: Jun. 18, 2024

(54) HEAT-CURABLE CITRACONIMIDE RESIN COMPOSITION

(71) Applicant: Shin-Etsu Chemical Co., Ltd., Tokyo (JP)

(72) Inventors: Yoshihiro Tsutsumi, Annaka (JP); Naoyuki Kushihara, Annaka (JP); Rina Sasahara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 14 days.

(21) Appl. No.: 17/687,420

(22) Filed: Mar. 4, 2022

(65) Prior Publication Data

US 2022/0306808 A1     Sep. 29, 2022

(30) Foreign Application Priority Data

Mar. 23, 2021     (JP) .................. 2021-048102

(51) Int. Cl.
| | |
|---|---|
| C08G 73/10 | (2006.01) |
| C08J 5/18 | (2006.01) |
| C08J 5/24 | (2006.01) |
| C09J 179/08 | (2006.01) |

(52) U.S. Cl.
CPC ............ *C08G 73/1082* (2013.01); *C08J 5/18* (2013.01); *C08J 5/24* (2013.01); *C09J 179/08* (2013.01); *C08J 2379/08* (2013.01)

(58) Field of Classification Search
CPC . C08G 73/1082; C08J 5/18; C08J 5/24; C08J 2379/08; C09J 179/08
USPC ........................................................ 523/205
See application file for complete search history.

(56) References Cited

U.S. PATENT DOCUMENTS

| | | | |
|---|---|---|---|
| 7,208,566 | B2 | 4/2007 | Mizori et al. |
| 8,048,489 | B2 | 11/2011 | Eisenhuth |
| 10,434,750 | B2 | 10/2019 | Takeuchi et al. |
| 2006/0216520 | A1 | 9/2006 | Osada |
| 2010/0175805 | A1 | 7/2010 | Wada |
| 2018/0002485 | A1 | 1/2018 | Tanigawa et al. |
| 2018/0112072 | A1 | 4/2018 | Kushihara et al. |
| 2019/0355638 | A1 | 11/2019 | Tsutsumi et al. |
| 2021/0278767 | A1 | 9/2021 | Ueno et al. |

FOREIGN PATENT DOCUMENTS

| | | |
|---|---|---|
| EP | 0 407 661 B1 | 5/1993 |
| JP | 1-210408 A | 8/1989 |
| JP | 5-500377 A | 1/1993 |
| JP | 2006-299246 A | 11/2006 |
| JP | 2006-526014 A | 11/2006 |
| JP | 2008-111111 A | 5/2008 |
| JP | 2009-1783 A | 1/2009 |
| JP | 2010-505966 A | 2/2010 |
| JP | 2010-159374 A | 7/2010 |
| JP | 2012-41386 A | 3/2012 |
| JP | 2012-117070 A | 6/2012 |
| JP | 2012-166515 A | 9/2012 |
| JP | 2018-70668 A | 5/2018 |
| JP | 2019-64926 A | 4/2019 |
| JP | 2019-203122 A | 11/2019 |
| JP | 2022-1615 A | 1/2022 |
| WO | WO2016/114286 A1 | 7/2016 |
| WO | WO2016/114287 A1 | 7/2016 |
| WO | WO 2020/004316 A1 | 1/2020 |

OTHER PUBLICATIONS

Arrigo et al., "Effect of SiO2 Particles on the Relaxation Dynamics of Epoxidized Natural Rubber (ENR) in the Melt State by Time-Resolved Mechanical Spectroscopy", Polymers, 2021, 13(2), 276. (Year: 2021).*
Japanese Office Action dated Nov. 28, 2023 for Application No. 2021-048102 with an English translation.

* cited by examiner

*Primary Examiner* — David T Karst
(74) *Attorney, Agent, or Firm* — Birch, Stewart, Kolasch & Birch, LLP

(57) ABSTRACT

Provided is a resin composition that has a low viscosity before curing, and is capable of being turned into a cured product having superior dielectric properties (low relative permittivity and low dielectric tangent), a low elastic modulus and also an excellent heat resistance. The resin composition is a heat-curable citraconimide resin composition containing:
(A) a citraconimide compound having a saturated or unsaturated divalent hydrocarbon group(s) having 6 to 100 carbon atoms;
(B) an epoxy resin having at least two epoxy groups in one molecule; and
(C) a reaction promoter,
wherein a mass ratio between the components (A) and (B) is (A):(B)=99:1 to 1:99.

14 Claims, No Drawings

HEAT-CURABLE CITRACONIMIDE RESIN COMPOSITION

BACKGROUND OF THE INVENTION

Field of the Invention

The present invention relates to a heat-curable citraconimide resin composition; and an uncured resin film, cured resin film, adhesive, semiconductor encapsulant, prepreg and substrate using such composition.

Background Art

Curable resins, particularly heat-curable resins are widely utilized in, for example, materials for adhesive bonding, cast molding, coating, impregnation, laminating and molding. However, in recent years, these curable resins have become versatile to the extent that conventional curable resins may not be satisfactory depending on a usage environment and a usage condition(s). For example, due to the progress of electronic devices, and for the purpose of improving the signal transmission speed, a material having low dielectric properties is now required for a laminate of a printed-wiring board that is to be installed in various electric devices. Further, as an electronic device component, there are semiconductor packages produced by encapsulating semiconductor elements with resins; since semiconductor elements are shifting from Si to SiC which is more excellent in high-temperature operability, a semiconductor encapsulant itself is now also required to possess a heat resistance.

Due to such background, studies are being aggressively conducted on maleimide compounds that are superior to epoxy resins as general heat-curable resins in dielectric properties, and have glass-transition temperatures (Tg) higher than those of epoxy resins; and these maleimide compounds are thus aggressively used as well. Particularly, there are already a number of reports on, for example, semiconductor encapsulants (JP-A-2006-299246 and JP-A-2008-111111) and substrate materials (JP-A-2012-41386 and JP-A-2012-166515) that employ low-molecular bismaleimide compounds such as 4,4'-diphenylmethanebismaleimide.

Meanwhile, there has been an increased number of reports on novel maleimide compounds and resin compositions using the same. For example, there are a maleimide compound having a biphenyl aralkyl frame with a high heat resistance (JP-A-2009-1783); a maleimide compound capable of maintaining a high Tg while lowering the melting point of the maleimide resin, as a result of introducing alkenyl groups into the compound (JP-A-2019-64926); and maleimide resins having particular kinds of aliphatic frames (Japanese Unexamined Patent Application Publication (Translation of PCT Application) No. 2006-526014 and JP-A-2012-117070).

Here, it became known that a maleimide resin having a particular kind of aliphatic frame possesses characteristics such as a low elastic modulus and superior dielectric properties due to the influence of such frame; there have been reported a number of compositions using this maleimide resin, such as an adhesive, a semiconductor encapsulant and a substrate material (WO2016/114286, WO2016/114287, JP-A-2018-70668 and JP-A-2019-203122).

As described above, while many studies and reports have been made on maleimide compounds, not many studies and reports have been made on citraconimide compounds as compounds resembling maleimide compounds. This is because, it is considered that unlike a maleimide compound, a citraconimide compound alone cannot undergo radical polymerization. There are also reports on citraconimide compounds and compositions containing the same; these reports are about compounds having limited types of structures, or about compositions using citraconimide compounds as tire additives (Japanese Unexamined Patent Application Publication (Translation of PCT Application) No. Hei 5-500377, Japanese Unexamined Patent Application Publication (Translation of PCT Application) No. 2010-505966 and JP-A-2010-159374).

SUMMARY OF THE INVENTION

Due to such background, various studies were made on compositions containing citraconimide compounds; as a result, it became clear that as compared to a maleimide compound having the same main frame, a citraconimide compound having a saturated or unsaturated divalent hydrocarbon group(s) having 6 to 100 carbon atoms is able to bring about various superior properties.

Thus, it is an object of the present invention to provide a resin composition that has a low viscosity before curing, and is capable of being turned into a cured product having superior dielectric properties (low relative permittivity and low dielectric tangent), a low elastic modulus and also an excellent heat resistance; and, for example, an uncured resin film, cured resin film, adhesive, semiconductor encapsulant, prepreg and substrate using such composition.

The inventors of the present invention diligently conducted a series of studies to solve the above problems, and completed the invention as follows. That is, the inventors found that the following heat-curable citraconimide resin composition was able to achieve the abovementioned object.

[1]

A heat-curable citraconimide resin composition comprising:
  (A) a citraconimide compound having a saturated or unsaturated divalent hydrocarbon group(s) having 6 to 100 carbon atoms;
  (B) an epoxy resin having at least two epoxy groups in one molecule; and
  (C) a reaction promoter,
wherein a mass ratio between the components (A) and (B) is (A):(B)=99:1 to 1:99.

[2]

The heat-curable citraconimide resin composition according to [1], wherein the citraconimide compound as the component (A) is a biscitraconimide compound having two citraconimide groups.

[3]

The heat-curable citraconimide resin composition according to [1] or [2], wherein the divalent hydrocarbon group is an aliphatic hydrocarbon group.

[4]

The heat-curable citraconimide resin composition according to any one of [1] to [3], wherein the divalent hydrocarbon group is selected from the saturated hydrocarbon groups having the following structures; and hydrocarbon groups derived from dimer acid frames,

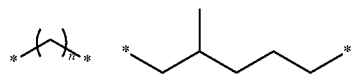

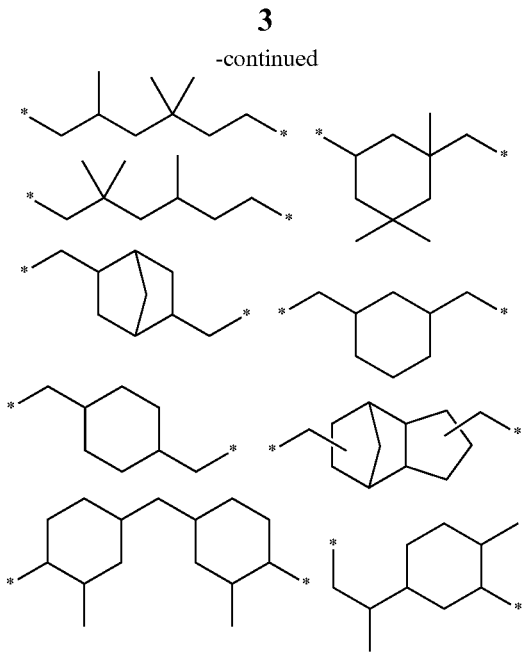

wherein * represents a bond with a nitrogen atom in the citraconimide group, n is 6 to 20.

[5]

The heat-curable citraconimide resin composition according to any one of [1] to [4], wherein the component (A) is represented by the following formula (1),

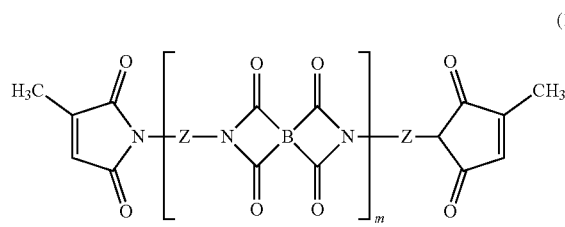

wherein B independently represents a cyclic structure-containing tetravalent organic group, Z independently represents a divalent hydrocarbon group having 6 to 100 carbon atoms, m is 0 to 10, provided that the structures of the repeating units identified by m may be identical to or different from each other, and at least one Z has a dimer acid frame-derived structure.

[6]

The heat-curable citraconimide resin composition according to [5], wherein in the formula (1), B is any one of the tetravalent organic groups represented by the following structural formulae,

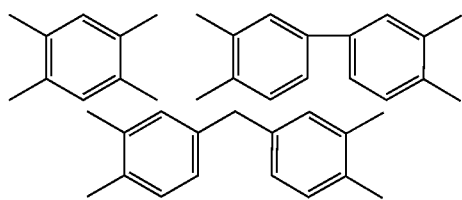

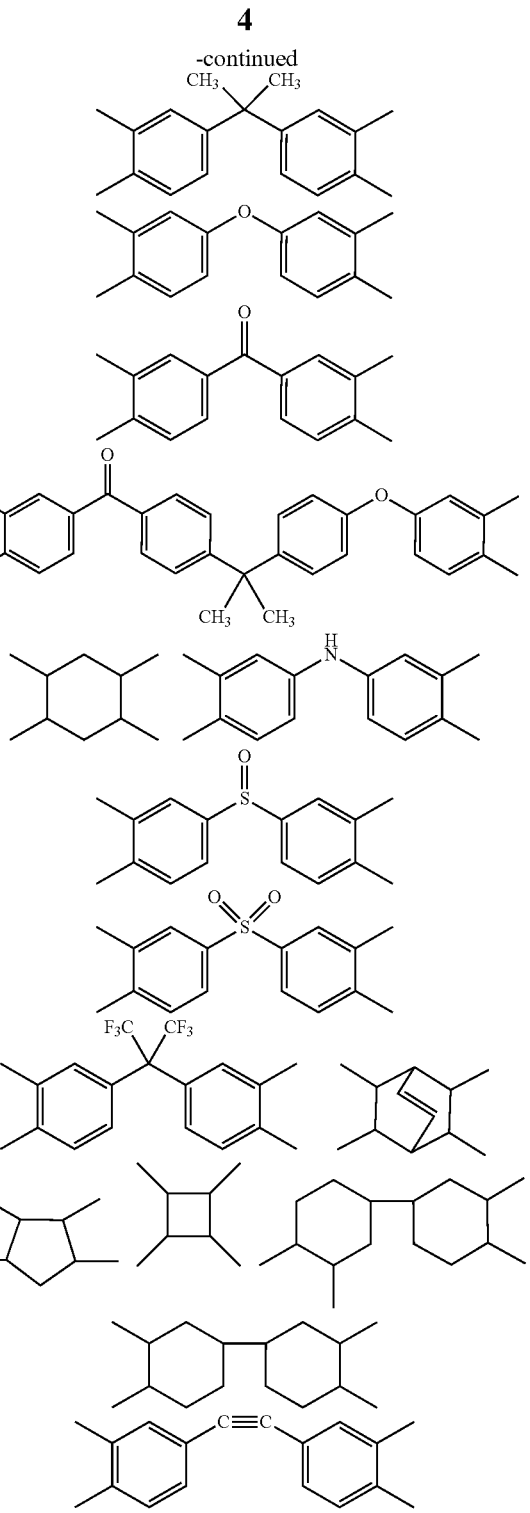

wherein bonds in the above structural formulae that are yet unbonded to substituent groups are to be bonded to carbonyl carbons forming cyclic imide structures in the general formula (1).

[7]

The heat-curable citraconimide resin composition according to any one of [1] to [6], wherein the reaction promoter as the component (C) is an anionic polymerization initiator containing at least one of a nitrogen and phosphorus atom(s).

[8]

An uncured resin film comprised of the heat-curable citraconimide resin composition according to any one of [1] to [7].

[9]

A cured resin film comprised of a cured product of the heat-curable citraconimide resin composition according to any one of [1] to [7].

[10]

A prepreg comprising the heat-curable citraconimide resin composition according to any one of [1] to [7]; and a fiber base material.

[11]

A substrate comprising the heat-curable citraconimide resin composition according to any one of [1] to [7].

[12]

An adhesive comprised of the heat-curable citraconimide resin composition according to any one of [1] to [7].

[13]

A semiconductor encapsulant comprised of the heat-curable citraconimide resin composition according to any one of [1] to [7].

The heat-curable citraconimide resin composition of the present invention is a resin composition that has a low viscosity before curing, and is capable of being turned into a cured product having superior dielectric properties (low relative permittivity and low dielectric tangent), a low elastic modulus and also an excellent heat resistance. Thus, the heat-curable citraconimide resin composition of the present invention is useful as an uncured resin film, a cured resin film, an adhesive and a semiconductor encapsulant, and is also useful as a material for a prepreg, a substrate or the like.

DETAILED DESCRIPTION OF THE INVENTION

The present invention is described in greater detail hereunder.

(A) Citraconimide Compound Having a Saturated or Unsaturated Divalent Hydrocarbon Group Having 6 to 100 Carbon Atoms A component (A) used in the present invention is a citraconimide compound that has a saturated or unsaturated divalent hydrocarbon group(s) having 6 to 100 carbon atoms. By having a long-chain hydrocarbon group, a cured product containing such citraconimide compound will exhibit a lower elastic modulus and improvements in dielectric properties.

A citraconimide group is a group obtained by substituting one hydrogen atom in a maleimide group with a methyl group. Due to the effects of this methyl group, as compared to a maleimide compound having an identical frame, not only a low permittivity and a low dielectric tangent will be exhibited, but properties such as a low viscosity and a low melting point will also be exhibited.

If the number of the carbon atoms of the divalent hydrocarbon group in the citraconimide compound is smaller than 6, the compound will have a higher melting point and thus a poor compatibility with other resins; in such case, target dielectric properties may not be achieved. Meanwhile, if the number of the carbon atoms of the divalent hydrocarbon group in the citraconimide compound is larger than 100, while superior dielectric properties will be exhibited, a heat resistance may be impaired due to the excessively long hydrocarbon group.

There are no particular restrictions on the property of the citraconimide compound as the component (A) at room temperature and the number average molecular weight thereof; it is preferred that the number average molecular weight of the citraconimide compound be not higher than 20,000, more preferably not higher than 15,000. Here, in the present invention, the number average molecular weight (Mn) is a number average molecular weight in terms of polystyrene that is measured by gel permeation chromatography (GPC) under the following measurement conditions.

[GPC Measurement Condition]

Developing solvent: Tetrahydrofuran (THF)
Flow rate: 0.35 mL/min
Detector: Differential refractive index detector (RI)
Column: TSK Guardcolumn Super H-L
  TSKgel Super HZ4000 (4.6 mmI.D.×15 cm×1)
  TSKgel Super HZ3000 (4.6 mmI.D.×15 cm×1)
  TSKgel Super HZ2000 (4.6 mmI.D.×15 cm×2)
  (Columns are all manufactured by TOSOH CORPORATION)
Column temperature: 40° C.
Sample injection volume: 5 μL (0.2% by mass THF solution)

It is preferred that the citraconimide compound as the component (A) be a biscitraconimide compound having two citraconimide groups in terms of an availability of an amine compound as a raw material, a solubility of the citraconimide compound in a solvent, and an ease of synthesis.

Further, in order to achieve a low elastic modulus and superior dielectric properties after curing, it is preferred that the divalent hydrocarbon group in the citraconimide compound be an aliphatic hydrocarbon group. It is more preferred that such aliphatic hydrocarbon group be selected from the saturated aliphatic hydrocarbon groups having the following structures; and hydrocarbon groups derived from dimer acid frames,

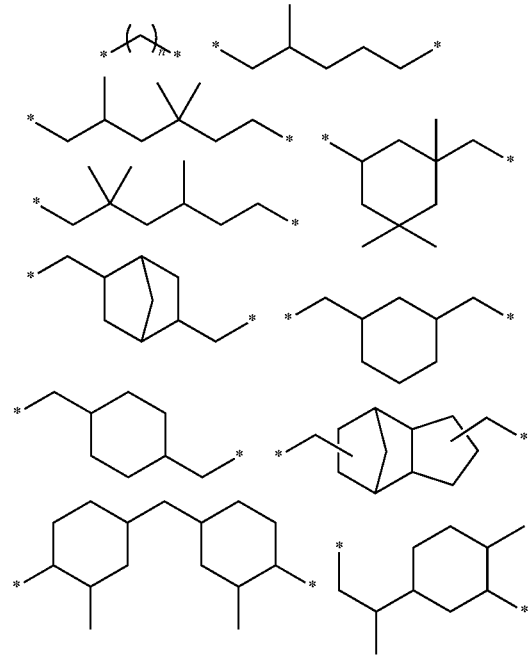

wherein * represents a bond with a nitrogen atom in the citraconimide group, n is 6 to 20.

Here, a dimer acid is a liquid dibasic acid whose main component is a dicarboxylic acid and whose carbon number is 36, the dibasic acid being generated by a dimerization of an unsaturated fatty acid whose raw material is a natural substance such as a vegetable fat and oil and whose carbon number is 18. When producing a citraconimide compound, dimer acids are converted to dimer diamines before use.

Thus, a dimer acid frame is not a single frame, but has multiple types of structures, and there exist several types of isomers. Typical dimer acids are categorized into types called (a) linear type, (b) monocyclic type, (c) aromatic cyclic type, and (d) polycyclic type.

That is, as a dimer acid frame-derived hydrocarbon group, preferred is a hydrocarbon group derived from any of the following dimer acids represented by (a) to (d). As mentioned above, since a dimer acid frame may have multiple structures, a dimer acid frame-derived hydrocarbon group in this specification may be expressed as —$C_{36}H_{72}$— in terms of an average structure thereof.

If the divalent hydrocarbon group in the component (A) is a dimer acid frame-derived hydrocarbon group, it is preferred that the component (A) be a citraconimide compound represented by the following formula (1).

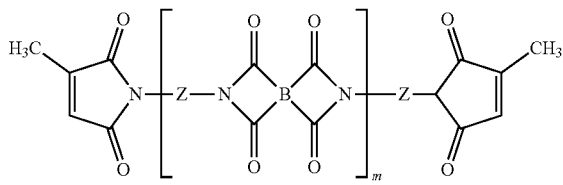
(1)

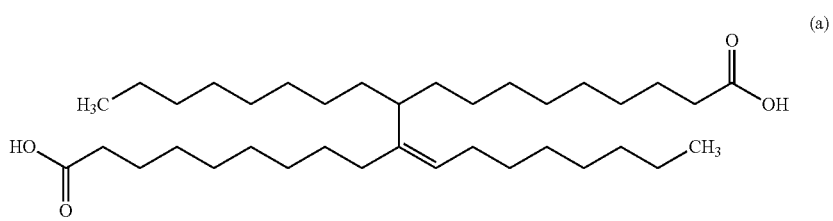
(a)

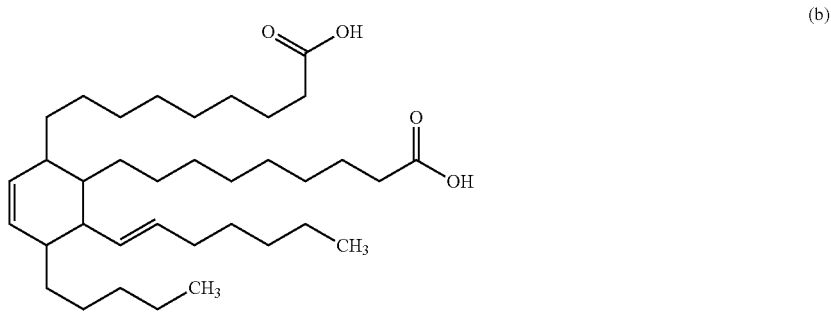
(b)

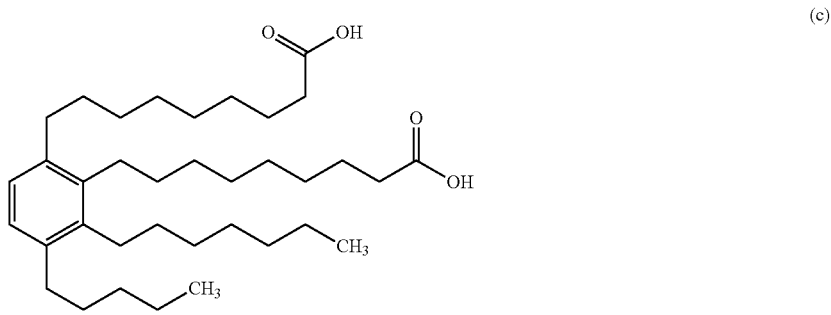
(c)

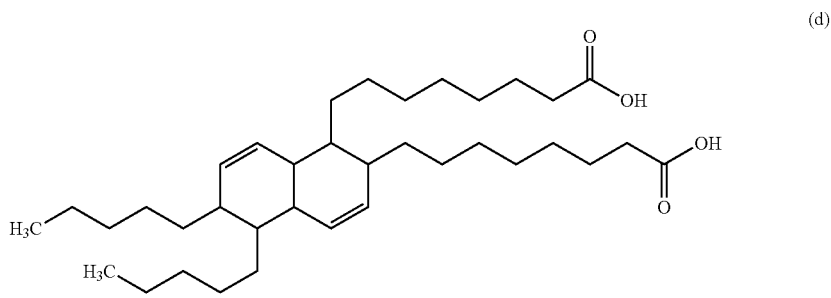
(d)

In the formula (1), B independently represents a cyclic structure-containing tetravalent organic group, Z independently represents a divalent hydrocarbon group having 6 to 100 carbon atoms, m is 0 to 10, provided that the structures of the repeating units identified by m may be identical to or different from each other, and at least one Z has a dimer acid frame-derived structure.

In the formula (1), B independently represents a cyclic structure-containing tetravalent organic group, particularly preferably any one of the tetravalent organic groups represented by the following structural formulae,

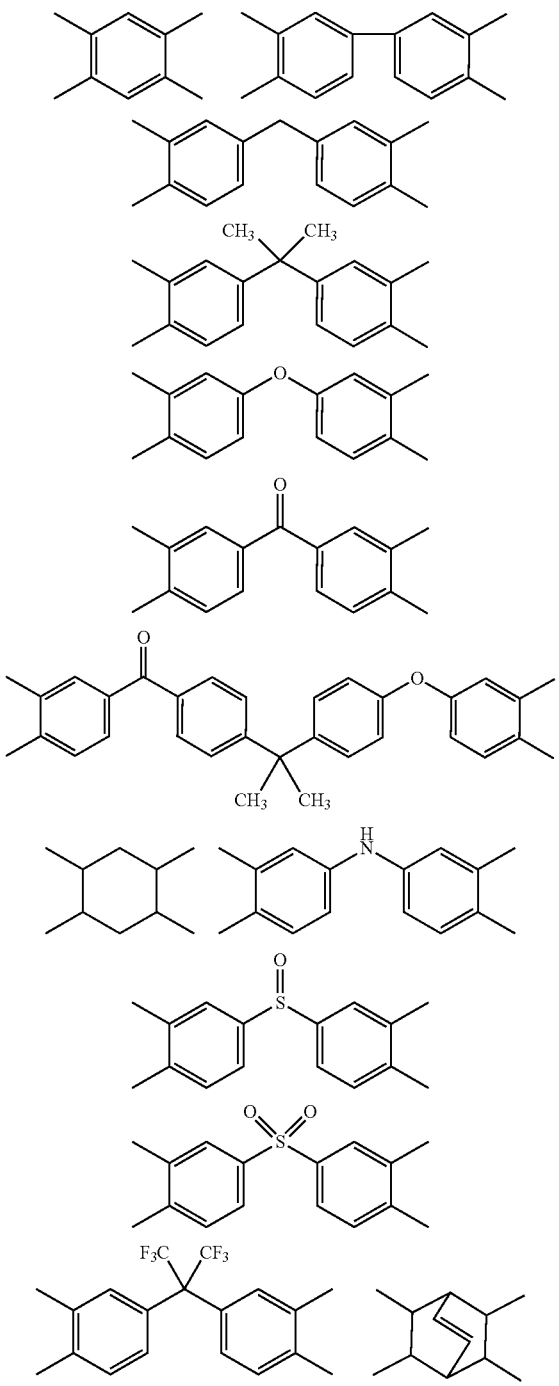

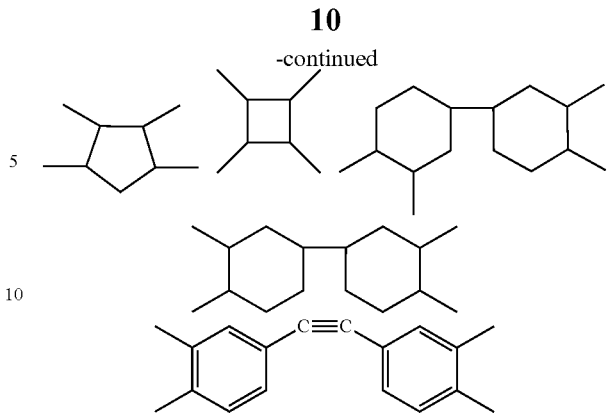

wherein bonds in the above structural formulae that are yet unbonded to substituent groups are to be bonded to carbonyl carbons forming cyclic imide structures in the general formula (1).

In the formula (1), Z independently represents a divalent hydrocarbon group having 6 to 100, preferably 6 to 50 carbon atoms; at least one Z represents a dimer acid frame-derived divalent hydrocarbon group, and it is preferred that such dimer acid frame-derived divalent hydrocarbon group be a branched divalent hydrocarbon group substituted by an alkyl or alkenyl group(s). The branched divalent hydrocarbon group may be a saturated aliphatic hydrocarbon group or an unsaturated hydrocarbon group. Specific examples of Z include the divalent hydrocarbon groups represented by the following structural formulae,

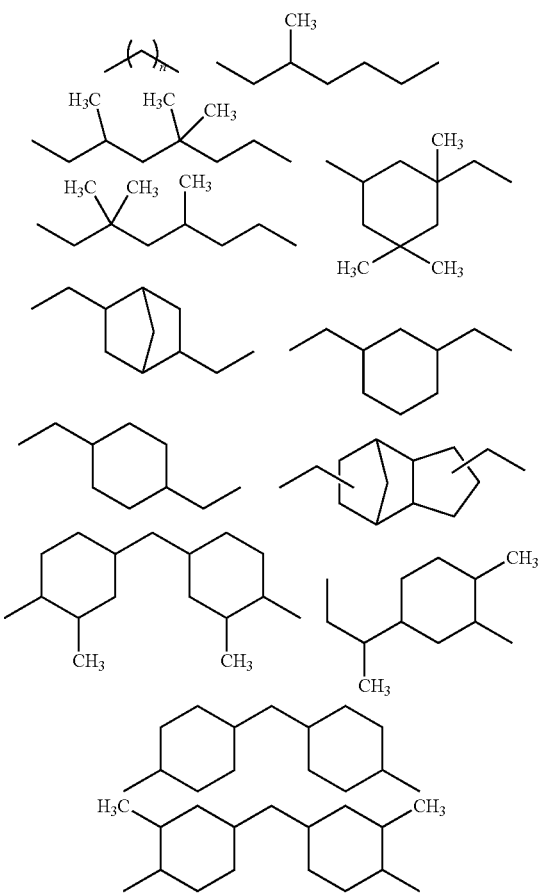

-continued

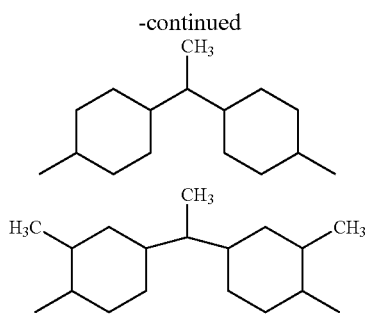

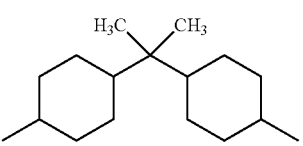

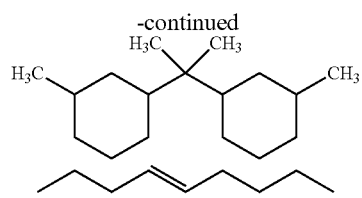

wherein n is 6 to 20.

In the formula (1), m is 0 to 10, preferably 0 to 8. The structures of the repeating units identified by m may be identical to or different from each other; if they are different from each other, there are two or more, preferably two to three kinds of repeating units.

Further, an alignment sequence of the repeating units depends on a production method; the alignment sequence may be either alternate, block or random, among which a block pattern is preferred.

Examples of the component (A) include those represented by the following structural formulae.

(2)

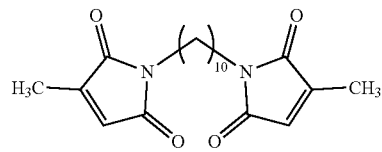

(3)

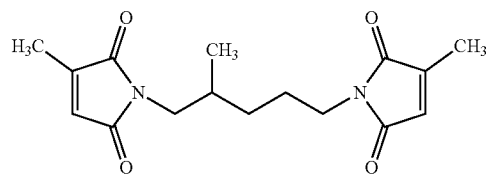

(4)

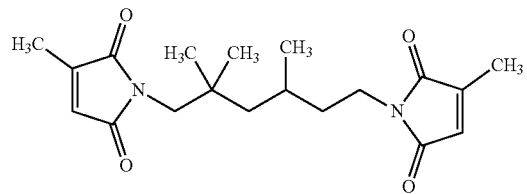

(5)

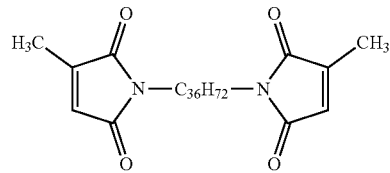

(6)

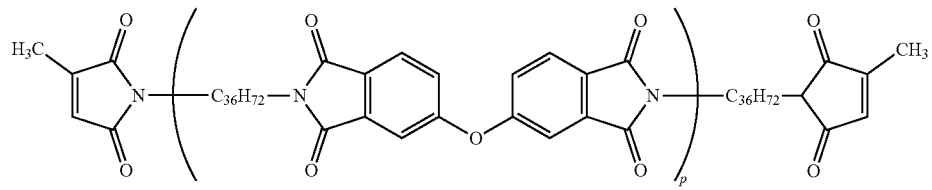

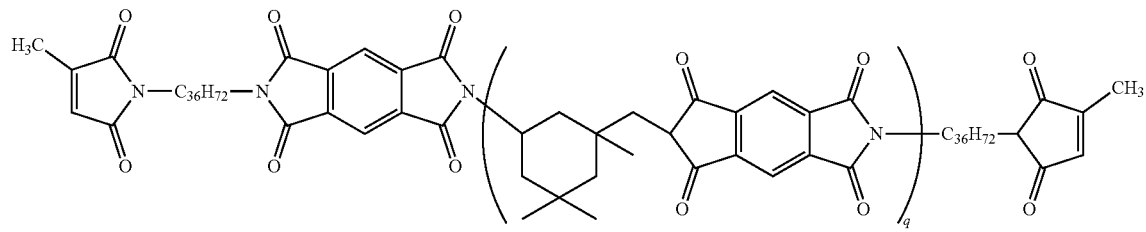

C$_{36}$H$_{72}$ in the formulae (5), (6) and (7) represents a dimer acid frame. In the formula (6), p is 1 to 10. In the formula (7), q is 1 to 10.

One kind of the citraconimide compound as the component (A) may be used alone, or two or more kinds thereof may be used in combination.

(B) Epoxy Resin Having at Least Two Epoxy Groups in One Molecule

A component (B) used in the present invention is an epoxy resin having at least two epoxy groups in one molecule. A cured product can be obtained by allowing the epoxy resin to react with the citraconimide compound as the component (A) via an anionic polymerization reaction. There are no particular restrictions on the epoxy resin used, as long as it has at least two epoxy groups in one molecule; in terms of handling property, it is preferred that the epoxy resin be a solid at room temperature (25° C.), more preferably a solid having a melting point of 40 to 150° C. or a softening point of 50 to 160° C.

Specific examples of the epoxy resin include a biphenol type epoxy resin such as a bisphenol A type epoxy resin, bisphenol F type epoxy resin, 3,3',5,5'-tetramethyl-4,4'-biphenol type epoxy resin and 4,4'-biphenol type epoxy resin; a novolac type epoxy resin such as a phenol novolac type epoxy resin, cresol novolac type epoxy resin and bisphenol A novolac type epoxy resin; a naphthalenediol type epoxy resin; a trisphenylol methane type epoxy resin; a tetrakisphenylol ethane type epoxy resin; a phenol biphenyl type epoxy resin; a dicyclopentadiene type epoxy resin; a biphenyl aralkyl type epoxy resin; an epoxy resin obtained by hydrogenating the aromatic rings in a phenol dicyclopentadiene novolac type epoxy resin; a triazine derivative epoxy resin; and an alicyclic epoxy resin. Particularly, preferred are a bisphenol A type epoxy resin, a dicyclopentadiene type epoxy resin and a biphenyl aralkyl type epoxy resin.

Any one kind of these epoxy resins may be used alone, or two or more kinds thereof may be used in combination. Further, if necessary, a given amount of an epoxy resin(s) other than the above listed epoxy resins may also be used together for given purposes.

A mass ratio between the components (A) and (B) is (A):(B)=99:1 to 1:99, preferably (A):(B)=98:2 to 5:95, more preferably (A):(B)=98:2 to 30:70. The usage of the component (A) alone will result in an extremely slow polymerization reaction, which makes it difficult to obtain a target cured product.

(C) Reaction Promoter

A reaction promoter as a component (C) is added to initiate and promote the anionic polymerization reaction between the citraconimide compound as the component (A) and the epoxy resin as the component (B).

There are no particular restrictions on the component (C) as long as it is capable of promoting such reaction; in terms of reaction mechanism, it is preferred that there be used an anionic polymerization initiator containing at least one of a nitrogen and phosphorus atom(s). Examples thereof include ion catalysts such as imidazoles (e.g. 2-ethyl-4-methylimidazole), tertiary amines, quaternary ammonium salts, borontrifluoride amine complex, organophosphines (e.g. triphenylphosphine) and an organophosphonium salt.

One kind of the reaction promoter as the component (C) may be used alone, or two or more kinds thereof may be used in combination.

It is not preferable to use a radical polymerization initiator such as an organic peroxide as the component (C) to promote a radical polymerization reaction when only the component (A) is used, because the radical polymerization reaction will not proceed easily due to an influence of steric hindrance caused by the methyl groups in the citraconimide compound.

It is preferred that the reaction promoter be added in an amount of 0.05 to 10 parts by mass, particularly preferably 0.1 to 5 parts by mass, per 100 parts by mass of a sum total of the heat-curable resin components such as the components (A) and (B).

It is not preferable if the amount of the reaction promoter added is out of the above ranges, because curing may take place extremely slowly or quickly at the time of molding the heat-curable citraconimide resin composition. Further, if the amount of the reaction promoter added is out of the above ranges, the cured product obtained may exhibit a poor balance between heat resistance and moisture resistance.

Other Additives

If necessary, various additives can further be added to the heat-curable citraconimide resin composition of the present invention on the premise that the effects of the present invention will not be impaired. Examples of those additives are as follows.

Heat-Curable Resin Having Reactive Groups Capable of Reacting with Citraconimide Groups Other than the component (B), a heat-curable resin having reactive groups capable of reacting with citraconimide groups may further be added in the present invention.

Examples of the reactive groups capable of reacting with citraconimide groups include a maleimide group; a hydroxyl group; an amino group; an allyl group; an alkenyl group such as a vinyl group; a (meth)acryl group; and a thiol group.

Further, there are no restrictions on the type of the reactive group-containing heat-curable resin; for example, there may be listed various resins other than the components (A) and (B), examples of which include a cyclic imide resin such as a maleimide resin, a phenolic resin, a melamine resin, a urea resin, a silicone resin, a modified polyphenylene ether resin, a heat-curable acrylic resin, and a polyfunctional thiol.

The heat-curable resin having the reactive groups capable of reacting with citraconimide groups is added in an amount of 0 to 30% by mass, preferably 0 to 20% by mass, per a sum total of the component (A), the component (B) and the heat-curable resin having the reactive groups capable of reacting with citraconimide groups.

Inorganic Filler

If necessary, an inorganic filler may further be added in the present invention. The inorganic filler is added for the purpose of improving a strength and rigidity of the cured product of the heat-curable citraconimide resin composition of the present invention, and/or adjusting a thermal expansion coefficient and a dimension stability of the cured product. As such inorganic filler, there may be used those that are normally added to epoxy resin compositions and silicone resin compositions. For example, there may be listed silicas such as a spherical silica, a molten silica and a crystalline silica; alumina; silicon nitride; aluminum nitride; boron nitride; barium sulfate; talc; clay; aluminum hydroxide; magnesium hydroxide; calcium carbonate; glass fibers; and glass particles. Further, for the sake of improving dielectric properties, there may also be used a fluorine-containing resin, a coating filler and/or hollow particles; and for the sake of, for example, imparting an electrical conductivity, there may also be added electrically conductive fillers such as metal particles, metal-coated inorganic particles, carbon fibers and carbon nanotubes. One kind of the inorganic filler may be used alone, or two or more kinds thereof may be used in combination.

There are no particular restrictions on the average particle size and shape of the inorganic filler; a spherical silica having an average particle size of 0.5 to 5 μm is particularly preferably used if molding an underfill material, a film or a substrate. A spherical silica having an average particle size of 3 to 45 μm is preferably used for adhesive and semiconductor encapsulant purposes. Here, the average particle size is a value obtained as a mass average value $D_{50}$ (or median size) in a particle size distribution measurement carried out by a laser diffraction method.

Further, in order to improve properties, it is preferred that the inorganic filler be such an inorganic filler that has been surface-treated with a silane coupling agent having organic groups capable of reacting with citraconimide groups. Examples of such silane coupling agent include an epoxy group-containing alkoxysilane, an amino group-containing alkoxysilane, a (meth)acryl group-containing alkoxysilane and an alkenyl group-containing alkoxysilane.

As such silane coupling agent, a (meth)acryl group and/or amino group-containing alkoxysilane is preferably used, specific examples of which include 3-methacryloxypropyltrimethoxysilane, 3-acryloxypropyltrimethoxysilane, N-phenyl-3-aminopropyltrimethoxysilane, N-2-(aminoethyl)-3-aminopropyltrimethoxysilane and 3-aminopropyltrimethoxysilane.

Others

Other than the above additives, there may also be added, for example, a nonfunctional silicone oil, a thermoplastic resin, a thermoplastic elastomer, an organic synthetic rubber, a photosensitizer, a light stabilizer, a polymerization inhibitor, a flame retardant, a colorant, a dye and an adhesion aid; and even an ion trapping agent for the purpose of improving electrical properties.

Production Method

A method for producing the resin composition of the present invention may, for example, be such a method where the components (A) to (C) and other additives if necessary are to be added, followed by using, for example, a planetary mixer or a stirrer to mix them.

The heat-curable citraconimide resin composition of the present invention may also be dissolved into an organic solvent so as to be treated as a varnish. By turning the composition into a varnish, film formation will be easier, and a glass cloth made of an E glass, low-dielectric glass, quartz glass or the like will be able to be coated and impregnated with the composition more easily so that a prepreg can be produced more easily. As for the organic solvent, any organic solvent may be used as long as it allows the heat-curable resin contents which are the components (A) and (B) to be dissolved therein. The prepreg of the present invention can be produced by a conventional method where the composition of the present invention is to be dissolved into the organic solvent at a given compositional ratio, followed by impregnating a fiber base material with the composition before performing drying by heating.

The heat-curable citraconimide resin composition of the present invention can be turned into an uncured resin sheet or film by applying the abovementioned varnish to a base material, and then eliminating the solvent, and further turned into a cured resin sheet or film by curing the same.

Below is an example of a method for producing the sheet and film; the production method shall not be limited to the one described hereunder.

For example, after applying the heat-curable citraconimide resin composition dissolved in the organic solvent to the base material, heating will be performed at a temperature of usually not lower than 80° C., preferably not lower than 100° C. for 0.5 to 5 hours so as to eliminate the organic solvent, followed by further performing heating at a temperature of not lower than 130° C., preferably not lower than 150° C. for another 0.5 to 10 hours so as to allow there to be formed a strong maleimide resin cured film with a flat surface. The temperature in the drying step for eliminating the organic solvent and the temperature in the subsequent heating and curing step may each be constant; it is preferred that these temperatures be raised in a step-wise manner. In this way, the organic solvent can be efficiently eliminated from the composition, and the curing reaction of the resin can efficiently proceed as well. There are no particular restrictions on a method of application; there may be employed methods using, for example, a spin coater, a slit coater, a sprayer, a dip coater or a bar coater.

As the base material, there may be used those that are generally used, examples of which include polyolefin resins such as a polyethylene (PE) resin, a polypropylene (PP) resin and a polystyrene (PS) resin, and polyester resins such as a polyethylene terephthalate (PET), a polybutylene terephthalate (PBT) resin and a polycarbonate (PC) resin; these base materials may be such that the surfaces thereof have already been subjected to a mold release treatment. Further, there are no particular restrictions on the thickness of a coating layer; a thickness after distilling away the solvent is in a range of 1 to 100 μm, preferably 3 to 80 μm. A cover film may further be provided on the coating layer.

Other than the above method, the components may be preliminarily mixed together, followed by using a melting and kneading machine to push out the mixture into the shape of a sheet or film so that such sheet or film can then be used as it is.

If producing the composition as a semiconductor encapsulant, the components (A) to (C) and other components if necessary are to be combined together at given compositional ratios, followed by using a mixer or the like to sufficiently uniformly mix them, melt-mixing the mixed product using a heating roll, a kneader, an extruder or the like, cooling the melt-mixed product so as to solidify the same, and then crushing the solidified product into pieces of a proper size. The resin composition thus obtained can be used as an encapsulant.

Further, if producing the composition as an adhesive, the components (A) to (C) and other components if necessary are to be combined together at given compositional ratios, followed by using a mixer such as a planetary mixer to mix them, and then, if necessary, using a triple roll mill to knead and mix them so as to improve a dispersibility. The resin composition thus obtained can be used as an adhesive.

As a general molding method using a semiconductor encapsulant, there can be listed a transfer molding method and a compression molding method. In a transfer molding method, a transfer molding machine is used to perform molding under a molding pressure of 5 to 20 N/mm² and at a molding temperature of 120 to 190° C. for a molding time of 30 to 500 sec, preferably at a molding temperature of 150 to 185° C. for a molding time of 30 to 180 sec. Further, in a compression molding method, a compression molding machine is used to perform molding at a molding temperature of 120 to 190° C. for a molding time of 30 to 600 sec, preferably at a molding temperature of 130 to 160° C. for a molding time of 120 to 300 sec. Moreover, in each molding method, post curing may be performed at 150 to 225° C. for 0.5 to 20 hours.

WORKING EXAMPLES

The present invention is described in detail hereunder with reference to working and comparative examples; the present invention shall not be limited to the following working examples.

The components used in working and comparative examples are shown below. Here, in the description hereafter, a number average molecular weight (Mn) is a value measured by gel permeation chromatography (GPC) under the following measurement conditions, with polystyrene being used as a reference material.

[GPC Measurement Condition]
Developing solvent: Tetrahydrofuran (THF)
Flow rate: 0.35 mL/min
Detector: Differential refractive index detector (RI)
Column: TSK Guardcolumn Super H-L
TSKgel Super HZ4000 (4.6 mmI.D.×15 cm×1)
TSKgel Super HZ3000 (4.6 mmI.D.×15 cm×1)
TSKgel Super HZ2000 (4.6 mmI.D.×15 cm×2)
(Columns are all manufactured by TOSOH CORPORATION)
Column temperature: 40° C.
Sample injection volume: 5 μL (0.2% by mass THF solution)

Synthesis Example 1 (Production of Citraconimide Compound, Formula (3))

A reaction solution was prepared by adding 52.29 g (0.45 mol) of 2-methylpentanediamine, 111.0 g (0.99 mol) of citraconic anhydride and 150 g of toluene into a 2 L glass four-necked flask equipped with a stirrer, a Dean Stark tube, a cooling condenser and a thermometer. The reaction solution was then stirred at 80° C. for three hours to synthesize an amic acid. Next, 40 g of methanesulfonic acid was added to the reaction solution, followed by raising the temperature to 110° C. so as to perform stirring for 16 hours while distilling away water generated as a by-product. The reaction solution was then washed five times with 200 g of an ion-exchange water. Later, stripping was performed under a reduced pressure at 60° C. to obtain 130.1 g (yield 95%) of a target product that was in the form of a brown liquid at room temperature (formula (3), (A-1), Mn 510).

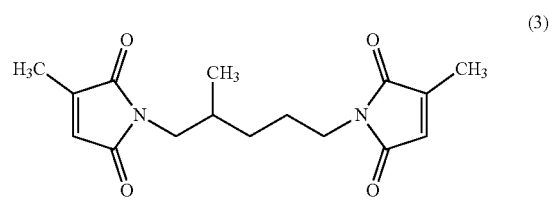

(3)

Synthesis Example 2 (Production of Citraconimide Compound, Formula (4))

A reaction solution was prepared by adding 71.2 g (0.45 mol) of 2,2,4-trimethylhexanediamine, 111.0 g (0.99 mol) of citraconic anhydride and 150 g of toluene into a 2 L glass four-necked flask equipped with a stirrer, a Dean Stark tube, a cooling condenser and a thermometer. The reaction solution was then stirred at 80° C. for three hours to synthesize an amic acid. Next, 40 g of methanesulfonic acid was added to the reaction solution, followed by raising the temperature to 110° C. so as to perform stirring for 16 hours while distilling away water generated as a by-product. The reaction solution was then washed five times with 200 g of an ion-exchange water. Later, stripping was performed under a reduced pressure at 60° C. to obtain 149.7 g (yield 96%) of a target product that was in the form of a brown liquid at room temperature (formula (4), (A-2), Mn 590).

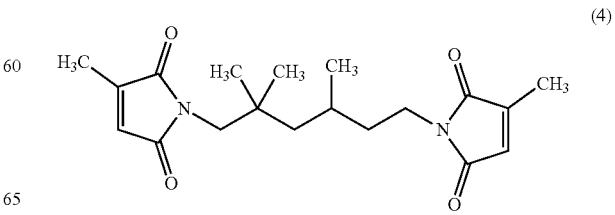

(4)

(A-3): Citraconimide compound represented by the following formula (5) (BCI-737 by Designer Molecules Inc.)

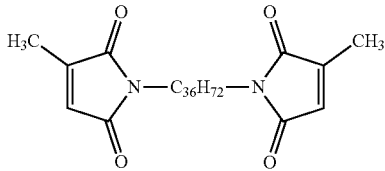

(5)

In this formula, $C_{36}H_{72}$ represents a dimer acid frame.

(A-4): Citraconimide compound represented by the following formula (6) (BCI-1500 by Designer Molecules Inc.)

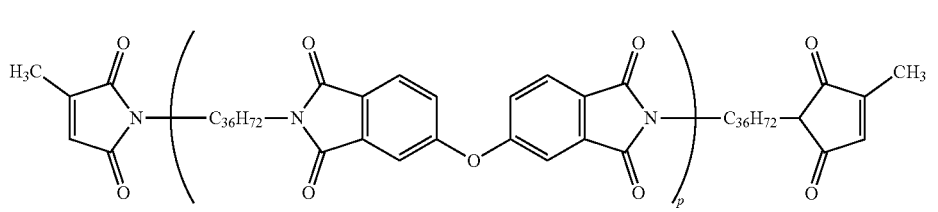

(6)

In this formula, $p \approx 3$; $C_{36}H_{72}$ represents a dimer acid frame.

Synthesis Example 3 (Production of Citraconimide Compound, Formula (7))

A reaction solution was prepared by adding 37.25 g (0.219 mol) of isophoronediamine, 76.94 g (0.35 mol) of pyromellitic acid anhydride and 350 g of toluene into a 2 L glass four-necked flask equipped with a stirrer, a Dean Stark tube, a cooling condenser and a thermometer. The reaction solution was then stirred at 80° C. for three hours to synthesize an amic acid. Next, the temperature of the reaction solution was directly raised to 110° C. so as to then perform stirring for four hours while distilling away water generated as a by-product, thereby synthesizing a block copolymer.

Later, another reaction solution was prepared by adding Priamine-1075 (average composition formula $H_2N—C_{36}H_{72}—NH_2$ by Croda International Plc) into the flask containing the block copolymer solution that had been cooled to room temperature. This reaction solution was then stirred at 80° C. for three hours to synthesize an amic acid. Next, the temperature of such reaction solution was directly raised to 110° C. so as to then perform stirring for four hours while distilling away water generated as a by-product, thereby synthesizing a dual-end type diamine compound.

After cooling the flask containing the obtained dual-end type diamine compound solution to room temperature, 21.63 g (0.193 mol) of citraconic anhydride was added thereto to prepare yet another reaction solution, followed by performing heating again so as to then stir this reaction solution at 80° C. for three hours, thereby synthesizing an amic acid. Next, the temperature of such reaction solution was directly raised to 110° C. so as to then perform stirring for 15 hours while distilling away water generated as a by-product, and then wash the reaction solution five times with 300 g of water, thereby obtaining a varnish of a bismaleimide compound. Later, the varnish was delivered into 3,000 g of isopropyl alcohol (IPA) by drops to cause reprecipitation, followed by eliminating the solvent and then performing drying so as to obtain 196.2 g (yield 80%) of a target dark brown solid (formula (7), (A-5), Mn 8,000)).

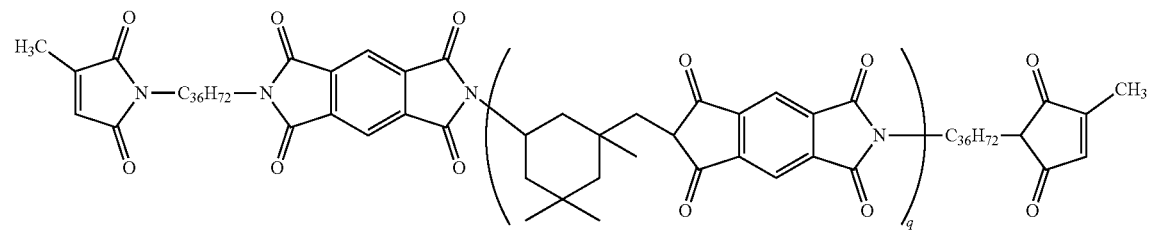

(7)

In this formula, q≈5; $C_{36}H_{72}$ represents a dimer acid frame.

(B) Epoxy Resin Having at Least Two Epoxy Groups in One Molecule (B-1): Bisphenol A type epoxy resin (jER-828 by Mitsubishi Chemical Corporation)

(B-2): Biphenyl aralkyl type epoxy resin (NC-3000 by Nippon Kayaku Co., Ltd.)

(C) Reaction Promoter (C-1): 2-ethyl-4-methylimidazole (2E4MZ by SHIKOKU CHEMICALS CORPORATION)

(C-2): Triphenylphosphine (TPP by HOKKO CHEMICAL INDUSTRY CO., LTD.)

(D) Maleimide Compound for Use in Comparative Example (D-3): Maleimide compound represented by the following formula (10) (SLK-6895 by Shin-Etsu Chemical Co., Ltd.)

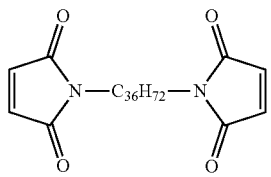

(10)

In this formula, $C_{36}H_{72}$ represents a dimer acid frame.

(D-4): Maleimide compound represented by the following formula (11) (SLK-1500 by Shin-Etsu Chemical Co., Ltd.)

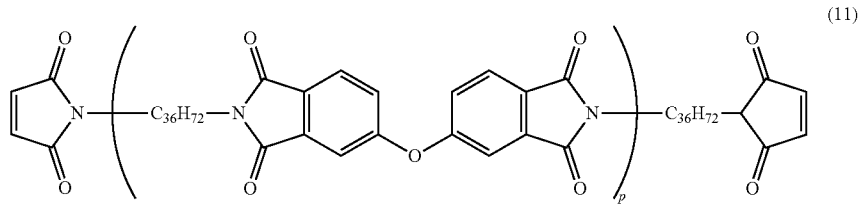

(11)

In this formula, r≈3; $C_{36}H_{72}$ represents a dimer acid frame.

Evaluation Test 1

Preparation of Composition

At the compounding ratios shown in Table 1, a double arm kneader (TK 0.5 by TOSHIN CO., LTD.) was used to perform mixing so as to prepare the composition. As for components that have high melting points and are thus difficult to be mixed, mixing was performed at 80° C. to prepare the composition.

Viscosity

A viscosity of the composition before curing (uncured resin) was measured by a method described in JIS Z8303: 2011, where a measurement temperature was 25° C., and an E-type viscometer was used. The results thereof are shown in Table 1.

Relative Permittivity, Dielectric Tangent

A frame having a diameter of 200 mm and a thickness of 150 μm was prepared. The uncured resin was then sandwiched between the frame and a 50 μm thick PET film that had been subjected to a mold release treatment (E7006 by TOYOBO CO., LTD.). A vacuum press machine (by Nikko-Materials Co., Ltd.) was then used to perform molding at 180° C. for 20 min to obtain a cured product. The cured product was then removed from the PET film, and was further subjected to final curing at 180° C. for two hours, thereby obtaining a cured resin film. A network analyzer (E5063-2D5 by Keysight Technologies) and a stripline (by KEYCOM Corporation) were connected to the cured resin film to measure a relative permittivity and a dielectric tangent thereof at a frequency of 10 GHz. The results are shown in Table 1.

Synthesis Example 4 (Production of Maleimide Compound, Formula (8))

A reaction solution was prepared by adding 52.29 g (0.45 mol) of 2-methylpentanediamine, 111.0 g (0.99 mol) of maleic anhydride and 150 g of toluene into a 2 L glass four-necked flask equipped with a stirrer, a Dean Stark tube, a cooling condenser and a thermometer. The reaction solution was then stirred at 80° C. for three hours to synthesize an amic acid. Next, after adding 40 g of methanesulfonic acid to the reaction solution, the temperature of the solution was raised to 110° C. so as to perform stirring for 16 hours while distilling away water generated as a by-product, and then wash the reaction solution five times with 200 g of an ion-exchange water. Later, the reaction solution washed was delivered into hexane by drops to cause reprecipitation, followed by performing drying so as to obtain 252.3 g (yield 90%) of a brown solid (formula (8), D-1).

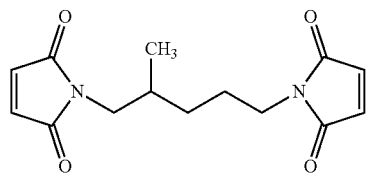

(8)

(D-2): Maleimide compound represented by the following formula (9) (BMI-TMH by Daiwa Kasei Industry Co., Ltd.)

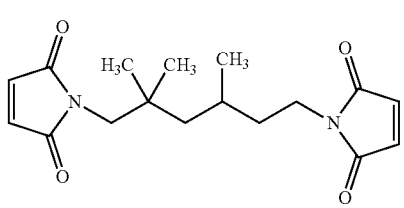

(9)

TABLE 1

| Composition table (part by mass) | | | Working example 1 | 2 | 3 | 4 | 5 | 6 | 7 | Comparative example 1 |
|---|---|---|---|---|---|---|---|---|---|---|
| (A) | Formula(3) | A-1 | 90.0 | | | | | | | |
| | Formula(4) | A-2 | | 90.0 | | | | | | |
| | BCI-737 | A-3 | | | 90.0 | 90.0 | 90.0 | | | |
| | BCI-1500 | A-4 | | | | | | 80.0 | | |
| | Formula(7) | A-5 | | | | | | | 80.0 | |
| (B) | jER-828 | B-1 | 10.0 | 10.0 | 10.0 | 10.0 | | 20.0 | 20.0 | 10.0 |
| | NC-3000 | B-2 | | | | | 10.0 | | | |
| (C) | 2E4MZ | C-1 | 0.5 | 0.5 | 0.5 | | | | 0.5 | 0.5 |
| | TPP | C-2 | | | | 1.0 | 1.0 | 1.0 | | |
| (D) | Formula(8) | D-1 | | | | | | | | 90.0 |
| | BMI-TMH | D-2 | | | | | | | | |
| | SLK-6895 | D-3 | | | | | | | | |
| | SLK-1500 | D-4 | | | | | | | | |
| Evaluation result | Viscosity | Pa·s | 1.1 | 1.3 | 3.2 | 3.2 | 4.9 | 103.0 | 139.5 | Unmeasurable |
| | Relative permittivity | — | 2.7 | 2.7 | 2.7 | 2.7 | 2.6 | 2.6 | 2.5 | 3.1 |
| | Dielectric tangent | — | 0.004 | 0.003 | 0.002 | 0.002 | 0.002 | 0.004 | 0.002 | 0.011 |

| Composition table (part by mass) | | | Comparative example 2 | 3 | 4 | 5 | 6 | 7 |
|---|---|---|---|---|---|---|---|---|
| (A) | Formula(3) | A-1 | | | | | | |
| | Formula(4) | A-2 | | | | | | |
| | BCI-737 | A-3 | | | 50.0 | | | |
| | BCI-1500 | A-4 | | | 50.0 | | | |
| | Formula(7) | A-5 | | | | | | |
| (B) | jER-828 | B-1 | 10.0 | 10.0 | | | 100.0 | 20.0 |
| | NC-3000 | B-2 | | | | | | |
| (C) | 2E4MZ | C-1 | 0.5 | 0.5 | 0.5 | 0.5 | 0.5 | 0.5 |
| | TPP | C-2 | | | | | | |
| (D) | Formula(8) | D-1 | | | | | | |
| | BMI-TMH | D-2 | 90.0 | | | | | |
| | SLK-6895 | D-3 | | 90.0 | | 100.0 | | |
| | SLK-1500 | D-4 | | | | | | 80.0 |
| Evaluation result | Viscosity | Pa·s | Unmeasurable | 6.5 | 1.8 | 4.2 | 12.6 | 149.2 |
| | Relative permittivity | — | | 3.0 | 2.8 | Failed to cure | Failed to cure | 3.3 | 2.7 |
| | Dielectric tangent | — | | 0.010 | 0.006 | | | 0.021 | 0.013 |

As can be seen from the results shown in Table 1, it became clear that the cured products of the citraconimide compound-containing compositions exhibited dielectric properties lower than those of the cured products of the compositions containing no citraconimide compound.

Evaluation Test 2
Preparation of Composition
At the compounding ratios shown in Table 2, a double arm kneader (TK 0.5 by TOSHIN CO., LTD.) was used to perform mixing so as to prepare the composition.

Viscosity
A viscosity of the composition before curing (uncured resin) was measured by a method described in JIS Z8303:2011, where a measurement temperature was 25° C., and an E-type viscometer was used. The results thereof are shown in Table 2.

Tensile Strength, Tensile Elastic Modulus, Tensile Strain
In accordance with JIS K 7161:1994, and using a cured product produced under a curing condition of "180° C. for two hours," there were measured a tensile strength, a tensile elastic modulus and a tensile strain. The results thereof are shown in Table 2.

Tensile Strength, Tensile Elastic Modulus, Tensile Strain after Stored at High Temperature
As is the above case, in accordance with JIS K 7161:1994, the cured product produced under the curing condition of "180° C. for two hours" was stored at 150° C. for 168 hours. After cooling the cured product to room temperature, there were measured a tensile strength, a tensile elastic modulus and a tensile strain in a similar manner as above. The results thereof are shown in Table 2.

TABLE 2

| Composition table (part by mass) | | | Working example | | | | Comparative example | | | |
|---|---|---|---|---|---|---|---|---|---|---|
| | | | 3 | 8 | 9 | 10 | 3 | 6 | 8 | 9 |
| (A) | BCI-737 | A-3 | 90.0 | 75.0 | 50.0 | 60.0 | | | | |
| (B) | jER-828 | B-1 | 10.0 | 25.0 | 50.0 | 25.0 | 10.0 | 100.0 | 25.0 | 50.0 |
| (C) | 2E4MZ | C-1 | 0.5 | 0.5 | 0.5 | 0.5 | 0.5 | 0.5 | 0.5 | 0.5 |
| (D) | SLK-6895 | D-3 | | | | 15.0 | 90.0 | | 75.0 | 50.0 |
| Evaluation result | Viscosity | Pa · s | 3.2 | 4.1 | 6.5 | 5.2 | 6.5 | 12.6 | 5.9 | 7.8 |
| | Tensile strength (MPa) | (Initial) | 11 | 15 | 20 | 15 | 11 | 40 | 15 | 19 |
| | | (After stored at high temperature) | 10 | 15 | 19 | 14 | 8 | 40 | 12 | 17 |
| | Tensile elastic modulus (MPa) | (Initial) | 125 | 200 | 400 | 360 | 325 | 1800 | 450 | 1000 |
| | | (After stored at high temperature) | 130 | 200 | 420 | 400 | 580 | 1800 | 700 | 1520 |
| | Tensile strain (%) | (Initial) | 50 | 35 | 20 | 30 | 15 | 2 | 10 | 8 |
| | | (After stored at high temperature) | 48 | 40 | 20 | 28 | 7 | 2 | 6 | 4 |

As can be seen from the results shown in Table 2, it became clear that the cured products of the citraconimide compound-containing compositions (working examples) had a heat resistance.

What is claimed is:

1. A heat-curable citraconimide resin composition comprising:
    (A) a citraconimide compound represented by the following formulae (5), (6) or (7),

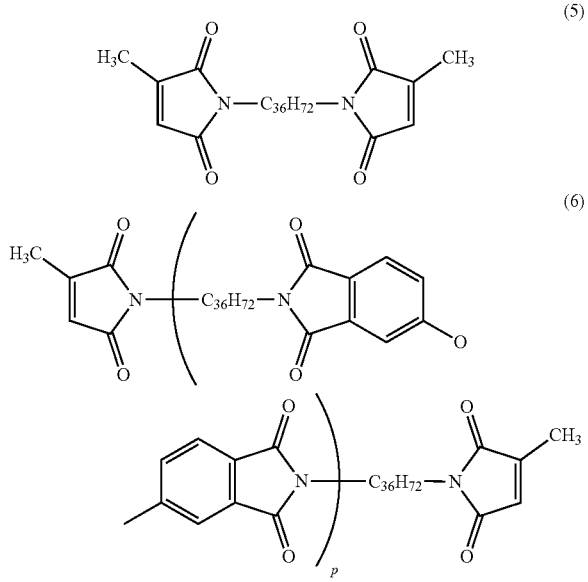

wherein p is 1 to 10 and $C_{36}H_{72}$ represents a dimer acid frame,

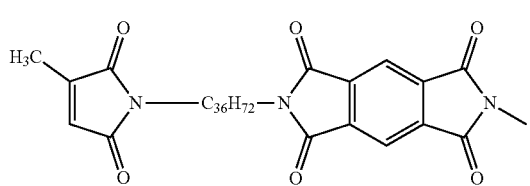

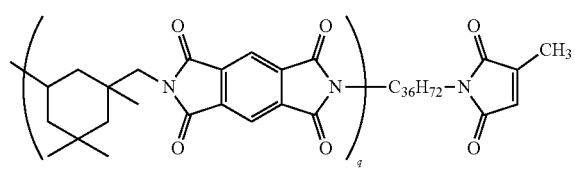

wherein q is 1 to 10 and $C_{36}H_{72}$ represents a dimer acid frame;
    (B) an epoxy resin having at least two epoxy groups in one molecule; and
    (C) a reaction promoter,
wherein a mass ratio between the components (A) and (B) is (A):(B)=99:1 to 1:99.

2. The heat-curable citraconimide resin composition according to claim 1, wherein the reaction promoter as the component (C) is an anionic polymerization initiator containing at least one of a nitrogen and phosphorus atom(s).

3. An uncured resin film comprised of the heat-curable citraconimide resin composition according to claim 1.

4. A cured resin film comprised of a cured product of the heat-curable citraconimide resin composition according to claim 1.

5. A prepreg comprising the heat-curable citraconimide resin composition according to claim 1; and a fiber base material.

6. A substrate comprising the heat-curable citraconimide resin composition according to claim 1.

7. An adhesive comprised of the heat-curable citraconimide resin composition according to claim 1.

8. A semiconductor encapsulant comprised of the heat-curable citraconimide resin composition according to claim 1.

9. The heat-curable citraconimide resin composition according to claim 1, wherein a mass ratio between the components (A) and (B) is (A):(B)=98:2 to 5:95.

10. The heat-curable citraconimide resin composition according to claim 1, wherein a mass ratio between the components (A) and (B) is (A):(B)=98:2 to 30:70.

11. The heat-curable citraconimide resin composition according to claim 1, wherein said citraconimide compound is represented by the formula:

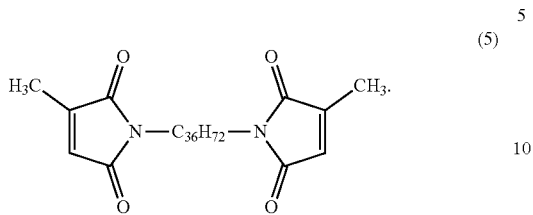

(5)

12. The heat-curable citraconimide resin composition according to claim 1, wherein said citraconimide compound is represented by the formula:

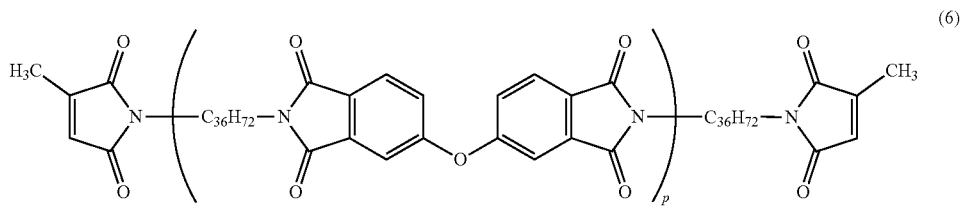

(6)

wherein p≈3 and $C_{36}H_{72}$ represents a dimer acid frame.

13. The heat-curable citraconimide resin composition according to claim 1, wherein said citraconimide compound is represented by the formula:

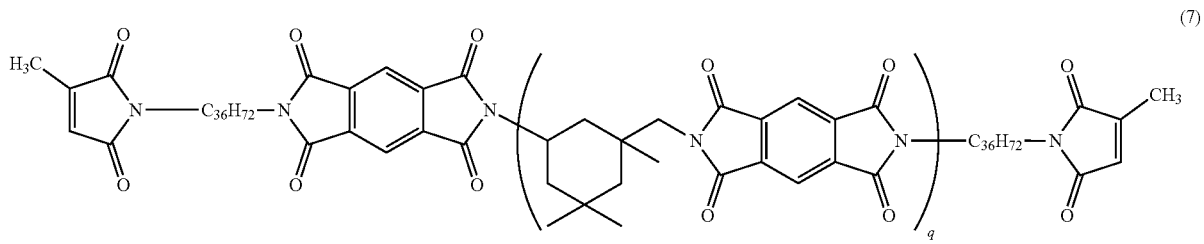

(7)

wherein q≈3 and $C_{36}H_{72}$ represents a dimer acid frame.

14. The heat-curable citraconimide resin composition according to claim 1, wherein the epoxy resin of component (B) is solid at 25° C. and has a melting point of 40 to 150° C. or a softening point of 50 to 160° C.

\* \* \* \* \*